March 19, 1929.  T. E. INGRAM  1,705,922
TRAFFIC SIGNAL
Filed June 28, 1926  2 Sheets-Sheet 1
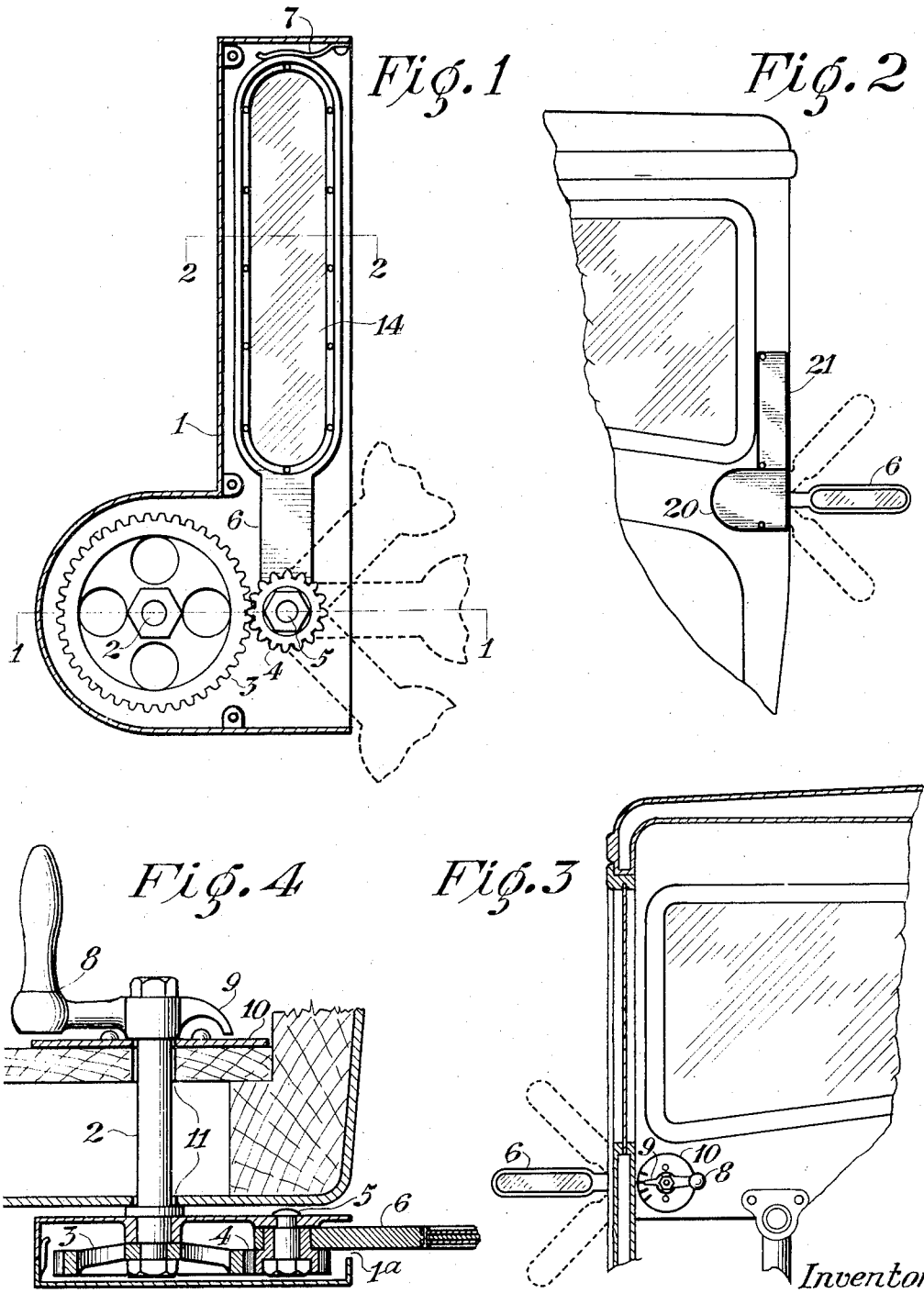
Inventor
Thunelda E. Ingram
per Adam E. Fisher.
Attorney.

March 19, 1929.　　　T. E. INGRAM　　　1,705,922
TRAFFIC SIGNAL
Filed June 28, 1926　　2 Sheets-Sheet 2
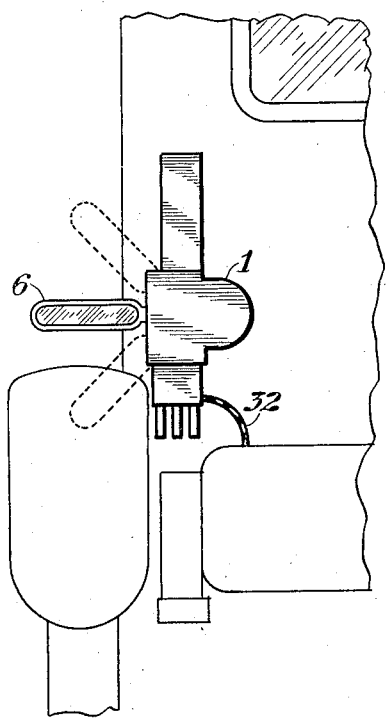
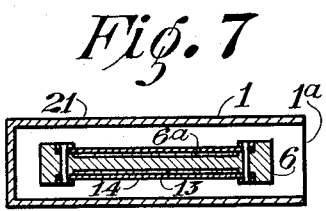
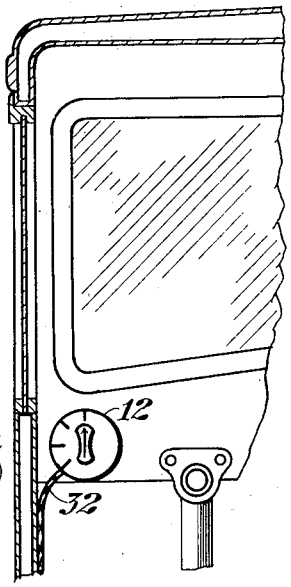
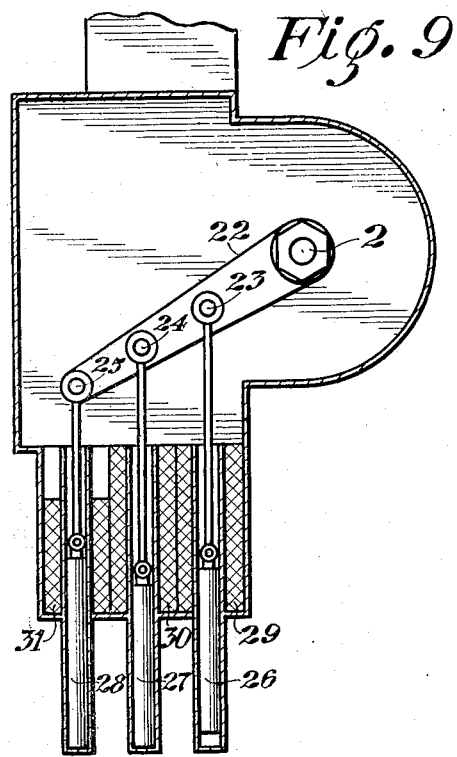
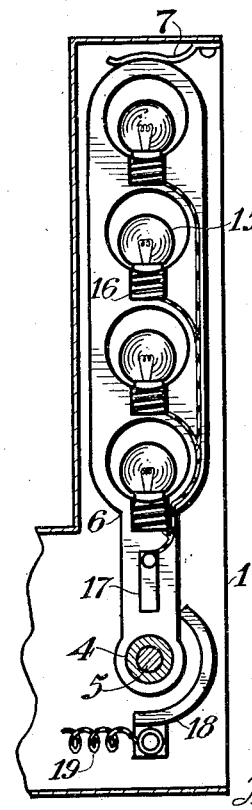
Inventor
Thusnelda E. Ingram
per Adam E. Fisher
Attorney.

Patented Mar. 19, 1929.

1,705,922

UNITED STATES PATENT OFFICE.

THUSNELDA E. INGRAM, OF WILLOWS, CALIFORNIA.

TRAFFIC SIGNAL.

Application filed June 28, 1926. Serial No. 118,921.

This invention consists of a day and night traffic signal, and one object of the invention is to provide a useful and novel device whereby the driver or operator of a vehicle, and particularly a motor vehicle, may cause to make known to others his intention with regard to the manipulation of said vehicle.

Another object is to provide a simple and unobstrusive device of the character indicated herein, which, when the signal is in the non-indicating position, is hidden from view and does not project beyond the body of the vehicle.

Another object is to provide, in such a device, a simple means of operation, so that a desired signal may be given with little effort or distraction.

Another object is to provide, by such a device, a means of giving such indications without requiring any part of the body of the person giving the signal to be extended beyond the confines of the body of the vehicle.

Another object is to provide, by such a device, an illumination of said signal inherent therein, so as to render the signal visible by night as well as by day.

With the above and other objects in view, the invention consists of the combination and arrangement of parts and in the details of construction hereinafter described and claimed; it being understood that, within the scope of what is claimed, changes in the precise embodiment of the invention shown can be made without departing from the spirit of the invention.

In the drawing

Figure 1 is an elevation of the invention with the cover plate removed;

Figure 2 is an elevation of the invention in use on a motor vehicle as viewed from the front of said vehicle, when used in the position on the vehicle as shown;

Figure 3 is an elevation of the invention in use on a motor vehicle as viewed from the driver's seat when said invention is manually operated;

Figure 4 is a section on the line 1—1 of Figure 1;

Figure 5 is an elevation of the invention in use on a motor vehicle when used on the rear portion of a motor vehicle as shown and the invention is electrically operated;

Figure 6 is an elevation of the invention in use on a motor vehicle as viewed from the driver's seat and the invention is electrically operated;

Figure 7 is a section along the line 2—2 of Figure 1 showing the construction of the semaphore;

Figure 8 is a modification of the semaphore showing a further method of illumination by means of electric light bulbs affixed therein;

Figure 9 is an elevation of the invention when electrically operated and with the cover plate removed.

Referring particularly to the accompanying drawings, 1 refers to a housing of suitable material, such as drawn steel, within which is revolvably situated a shaft 2 having affixed thereto the gear 3 which engages the pinion 4, said pinion 4 being revolvably situated on the pin 5 mounted on said housing 1. Said pinion 4 has affixed to it the semaphore 6, said semaphore being so situated in the housing 1 as to be enclosed by same when in the non-indicating position, and being restrained from vibration by the engagement of the tip of the semaphore with the flexible metal piece 7 when in the non-indicating position. Said housing 1 is so constructed as to permit the passage of the semaphore 6 through an aperture or slot 1$^A$ in said housing 1 so as to bring the semaphore 6 into view in any desired position or indication, said position being determined by the rotation in angular displacement of the gear 3 which engages the pinion 4 causing the angular displacement of the semaphore about the center line of the pin 5. The shaft 2, when manually operated, passes through the cowl or dash of the vehicle through a suitable aperture 11 and carries at its other end a crank or handle 8, the relative position of said crank 8 being measured by the relationship of the pointer 9 attached to the crank 8 with respect to the scale or index 10 which is affixed to the cowl or dash of the vehicle in a suitable position concentric to the shaft 2 and marked in such a manner as to indicate the position of, or indication or signal being given by the semaphore. When the device is to be electrically operated, the shaft 2 has positioned thereon the crank 22, said crank having mounted thereon and positioned radially outwardly from the shaft 2, the three pins 23, 24 and 25. The plungers 26, 27 and 28 of the solenoids 29, 30 and 31 are pivotally mounted on the said pins 23, 24 and 25 substantially as shown, the said solenoids being alined with the said crank, each of the said plungers operatively engaging one of said solenoids, each of said plungers also having the same amplitude of operative movement but capable of being moved beyond the said amplitude of movement by the movement of an adjacent plunger. The solenoids 29, 30 and 31 are of a type usual to such apparatus and attached to the housing 1 in a suitable manner and are freely extensible axially in both directions through their respective solenoids, the energized action of any solenoid, as 31, being to cause its respective plunger 28 to be medially positioned in said solenoid, but if one of the radially inwardly disposed solenoids, as 29, is energized, its plunger 26 is caused to be likewise medially positioned in the solenoid 29, while the plunger 28 is extended upwardly from its solenoid 28. When so electrically operated, a switch 12 is to be provided in place of the crank 8 and designed to simulate the construction of the said crank 8, pointer 9 and scale 10, and carrying electrical contacts and conductors 32 of a suitable nature, so as to supply electrical energy to, and cause the operation of the solenoid 31 for the first position of the said semaphore, the operation of the solenoid 30 for the second position and the operation of the solenoid 29 for the third position. It is obvious that, if the distance of travel of the solenoids is the same in each case, each solenoid will cause an angular displacement of the shaft 2 proportional to the distance from the center of the shaft 2 to the pins 23, 24 and 25 aforesaid, thereby causing the angular displacement of the semaphore 6 and bringing the said semaphore 6 into view in any desired position substantially in the manner heretofore described. When no electrical energy is supplied to any of the said solenoids, the weight of the plungers 26, 27 and 28 acting together will cause the semaphore 6 to return to its non-indicating position in a manner the reverse of that heretofore described. In the preferred form of my invention, as shown, three solenoids are used, but it is obvious that a greater or less number of solenoids may be used at the option of the person constructing the device. When desired, three push button switches may be used in place of the switch 12 and having functions similar to said switch 12.

The semaphore 6 is constructed so as to have provided a recessed or hollow surface 6A therein, so as to permit the deposit or insertion of a self-luminous substance being protected from the atmosphere by a suitable transparent substance 14, such as glass or isinglass, and made part of the semaphore 6. In the drawing, the position of the self-luminous substance is indicated by the numeral 13. If desired, electric light bulbs 15 of a suitable nature may be inserted in the semaphore 6, being retained therein by the receptacles 16, and electrical energy supplied thereto by a contact spring 17 slidably engaging the insulated collar 18, said collar being connected to a suitable source of energy by means of the pig-tail connection 19 attached to but insulated from the housing 1.

It is intended that the housing 1 will be constructed so as to have a lower part 20 of drum shape and containing therein the operating mechanism heretofore described, and an upper part 21 of relatively narrow shape so as to fit along the corner post of the windshield or other part of a vehicle, particularly so as to offer little or no obstruction or impediment to the vision; also the said housing 1 is intended to have provided suitable brackets or other means of attachment to, and in any desired position on, said vehicle and not here shown.

I claim:

1. In a device of the kind described, a rotatable shaft, a crank mounted on the shaft, a plurality of solenoids alined with said crank, and a plurality of plungers pivoted to said crank successively radially outwardly thereon, each of said plungers operatively engaging one of said solenoids freely extensible axially in both directions therefrom, each of said plungers also having the same amplitude of operative movement but adapted to be moved therebeyond on operative movement of a radially inwardly disposed plunger.

2. A traffic signal comprising a semaphore, mechanism comprising a shaft and gears for causing the selective angular displacement of said semaphore, a crank mounted on said shaft, a plurality of solenoids alined with said crank, and a plurality of plungers pivoted to said crank and disposed thereon radially outwardly from said shaft proportionally to the selected angular displacement of said semaphore, each of said plungers operatively engaging one of said solenoids for equal amplitude of energized operative movement therein but adapted to be moved beyond the said amplitude of movement in a continuing direction from the solenoid when said crank is operated by a radially inwardly disposed plunger.

3. A traffic signal comprising a semaphore, mechanism comprising a shaft and gears for causing the angular displacement of said semaphore, a crank mounted on said shaft, the movement of said crank being proportional to the angular displacement of the semaphore, a plurality of solenoids alined with but below said crank, a plurality of plungers pivoted to said crank radially outwardly from said shaft, each of said plungers operatively engaging one of said solenoids for freely extensible axial movement in both directions therefrom, each of said plungers having the same amplitude of operative movement for medial position in its respective solenoid but adapted to be moved beyond the said amplitude of movement for extension from the solenoid when said crank is operated by a radially inwardly disposed plunger, whereby the said operative movement of each plunger will cause the angular displacement of said semaphore proportionally to the disposition of said plungers relative to said shaft, and means for supplying electrical energy to any one of said solenoids, the weight of said solenoids acting to reverse the movement of said crank when the supply of electrical energy is terminated.

In testimony whereof I affix my signature.

THUSNELDA E. INGRAM.